United States Patent [19]

Suzuki

[11] 3,903,177

[45] *Sept. 2, 1975

[54] RESORCINOL PROCESS

[75] Inventor: Shigeto Suzuki, San Francisco, Calif.

[73] Assignee: Chevron Research Company, San Francisco, Calif.

[ * ] Notice: The portion of the term of this patent subsequent to Sept. 18, 1990, has been disclaimed.

[22] Filed: July 18, 1973

[21] Appl. No.: 380,413

Related U.S. Application Data

[63] Continuation-in-part of Ser. No. 5,121, Jan. 22, 1970, Pat. No. 3,760,008.

[52] U.S. Cl. .................... 260/621 R; 260/524 R
[51] Int. Cl.² ........................................ C07C 29/00
[58] Field of Search ............ 260/515 A, 621 R, 629, 260/524 R, 650 R

[56] References Cited
UNITED STATES PATENTS

| | | | |
|---|---|---|---|
| 1,737,842 | 12/1929 | Hale et al. | 260/621 R |
| 1,878,463 | 9/1932 | Britton | 260/515 A |
| 2,563,820 | 4/1951 | Darragh et al. | 260/515 A |
| 2,727,924 | 12/1955 | Pearlman | 260/621 R |
| 2,727,926 | 12/1955 | Kaeding et al. | 260/621 R |
| 2,852,567 | 9/1958 | Barnhard et al. | 260/621 R |
| 2,999,879 | 9/1961 | Broich et al. | 260/515 A |
| 3,075,008 | 1/1963 | Girard et al. | 260/515 A |
| 3,089,905 | 5/1963 | Wygand | 260/621 R |
| 3,760,008 | 9/1973 | Suzuki | 260/621 R |
| 3,760,009 | 9/1973 | Suzuki | 260/621 R |

*Primary Examiner*—Howard T. Mars
*Assistant Examiner*—Norman Morgenstern
*Attorney, Agent, or Firm*—G. F. Magdeburger; John Stoner, Jr.; T. G. DeJonghe

[57] ABSTRACT

Resorcinol is produced from metaxylene by dichlorinating metaxylene, oxidizing the resulting 2,4- and 4,6- dichlorinated metaxylenes to produce dichloroisophthalic acids, reacting the acids with an alkali metal hydroxide forming the alkali metal salts of the dichloroisophthalic acids, and heating the salts at an elevated temperature in the presence of a limited amount of water.

3 Claims, No Drawings

RESORCINOL PROCESS

CROSS REFERENCE TO RELATED APPLICATION

This application is a continuation-in-part of copending application Ser. No. 5,121, filed Jan. 22, 1970, now U.S. Pat. No. 3,760,008.

FIELD OF THE INVENTION

This invention relates to a novel process for the production of resorcinol, particularly from alkali metal salts of 2,4- and/or 4,6-dichloroisophthalic acid, which are formed by chlorinating metaxylene and then oxidizing the 2,4- and 4,6-dichlorometaxylene product.

BACKGROUND OF THE INVENTION

It is known in the art to prepare resorcinol by the caustic fusion of the salts of 1,3-benzene disulfonic acid. There are a number of disadvantages incidental to this fusion reaction system, including mixing problems, poor heat transfer, and the like. Dilution with water does not lessen these problems, for the addition of water adversely affects the desired reaction.

THE INVENTION

It has now been found that resorcinol can be prepared by heating a mixture of an alkali metal salt of 2,4- and/or 4,6- dichloroisophthalic acid, alkali metal hydroxide and water at a temperature in the range from about 150°C. to 270°C., preferably 190°C. to 210°C., for a period in the range from about 0.2 to 2 hours, and acidifying the resulting reaction product mixture. Preferably the reaction is promoted by the presence of a copper catalyst in the reaction mixture. Surprisingly, the presence of water in the reaction mixture does not adversely affect the reaction, provided that the relative amount added is not too great. It appears, on a molecular basis, that the amount of water in the reaction mixture should not materially exceed the amount of the base and that the presence of a large relative amount of water operates detrimentally by reducing the basic strength of the hydroxide in the reaction mixture. For each mol of the salt, the reaction mixture should contain an amount of the hydroxide in the range from about 4 to 20 mols, preferably 6–14 mols. Although the amount of water which can be tolerated in the present process is small, nevertheless it is sufficient to alleviate the aforementioned problems incidental to the ordinary fusion reaction system.

The production of resorcinol by the present process is surprising in view of the art. U.S. Pat. No. 2,439,237 discloses that the treatment of polyhalo-substituted phthalic acid with a base yields polyhalobenzoic acid or polyhalobenzene. Apparently, in view of the present discovery, the geometric relationship of the carboxyl groups of a halo-substituted benzene dicarboxylate salt or acid drastically alters the course of and the products from displacements on aromatic carbon atoms.

The products obtained from halo-substituted phthalates (ortho carboxyl relationship) are different from those obtained from halo-substituted isophthalates (meta carboxyl relationship). The former yield halo-substituted benzoic acid and/or halo-substituted benzene, whereas the latter yield resorcinol.

A further conflicting factor in the present displacement reactions on aromatic carbon atoms in addition to the aforementioned geometric effect is associated with the pH of the reaction medium. Apparently pH plays an important role in displacements on aromatic carbon atoms of functional groups. U.S. Pat. No. 3,413,341 discloses that in halogen displacements on poly-functional substituted aromatic compounds effected at a pH below 7, halogen is displaced by hydroxyl and, where present, carboxyl groups are retained. The production of resorcinol as in the present process is consequently an unexpected, albeit very useful, result.

CHLORINATION AND OXIDATION OF METAXYLENE

Resorcinol is a well-known article of commerce. The 2,4- and 4,6-dichloroisophthalic acids, on the other hand, while not of particular commercial importance, are readily prepared from metaxylene. Metaxylene is readily chlorinated to 2,4- and 4,6-dichloro-1,3-dimethylbenzene in the presence of chlorine gas and $FeCl_3$ at temperatures from 0° to 80°C., preferably from 10° to 30°C. The reaction is also preferably carried out in the absence of light, in order to prevent chlorination of the alkyl group. See, for example, U.S. Pat. No. 3,035,103, in which paraxylene in a similar reaction is chlorinated to produce 2,5- dichloro-1,4-dimethylbenzene. The resulting 2,4- and 4,6-dichloro-1,3-dimethylbenzene isomers are readily separated from the reaction mixture using well-known distillation apparatus and techniques.

The 2,4- and 4,6-dichloroisophthalic acids are then prepared from the corresponding dichloro-metaxylenes (see, for example, U.S. Pat. No. 2,881,224) by conventional oxidation reactions, such as by the use of potassium permanganate, aqueous nitric acid and the like oxidation agents. Dichlorometaxylene may also be oxidized to dichloroisophthalic acid by the well-known cobalt-catalyzed, liquid-phase air oxidation processes.

PREFERRED EMBODIMENT

Dichloroisophthalic acid, aqueous sodium hydroxide, and cuprous oxide are charged to a pressure autoclave fitted for mixing. The amounts of each component are proportioned to yield a reaction mixture having the relative molecular amounts of dichloroisophthalate salt, sodium hydroxide, water and copper catalyst of 1:13:13:0.16, respectively. The autoclave plus charge in the liquid phase are heated at a temperature of 200°–210°C. for about 1 hour. The resulting reaction mixture is then cooled and acidified by dissolving carbon dioxide gas in the mixture. The liberated resorcinol is then removed by extraction with a suitable organic solvent, for example ethyl ether, and recovered by distillation.

The aqueous solution remaining after removal of the resorcinol contains a minor amount of reaction intermediates, mainly monochlorohydroxybenzene carboxylates and sodium bicarbonate from the main reaction (2 mols of sodium bicarbonate for each mol of resorcinol produced) and from excess sodium hydroxide. This solution is regenerated for recycle to the process by the addition of calcium oxide and filtration to remove the insoluble calcium carbonate formed in the regeneration stage as well as some of the sodium chloride, i.e., that amount in excess of solubility. After additions of the base and water to adjust for mechanical losses in the processing, the regenerated caustic medium is recycled to the process. The conversion of the feed is about 90–95 mol percent, and the yield is 95–98 mol percent.

THE REACTION EQUATIONS

The chemical conversions effected in the process of the invention may be summarized as follows:

1. $C_6H_2(CO_2Na)_2Cl_2 + 4NaOH \rightarrow m\text{-}C_6H_4(ONa)_2 + 2NaCl + 2NaHCO_3 + H_2O$
2. $NaHCO_3 + NaOH \rightarrow Na_2CO_3 + H_2O$
3. $m\text{-}C_6H_4(ONa)_2 + 2CO_2 + 2H_2O \rightarrow m\text{-}C_6H_4(OH)_2 + 2NaHCO_3$
4. $Na_2CO_3 + CO_2 + H_2O \rightarrow 2NaHCO_3$
5. $NaHCO_3 + CaO \rightarrow NaOH + CaCO_{3(s)}\downarrow$ Since both the 2,4- and 4,6-dichloroisophthalic acid isomers have chlorines in a meta relationship to one another, they both produce resorcinol by the process of this invention.

TEMPERATURE

The present process may be carried out over a range of temperatures with the usual reaction rate effect, i.e., the rate doubles for about each 10°C. incremental increase. At 150°C. there is an appreciable rate of resorcinol production. In the range 240°–270°C., on the other hand, one or more side reactions are experienced in which resorcinol is converted to undesirable by-product(s). Best results, in general, obtain at a temperature in the range 190°–210°C. after a period of about one hour. Satisfactory reaction temperatures in general are in the range above 150°C. and below 240°–270°C.

HYDROXIDE REACTANT

In order to effect the displacement of chloride and carboxyl (decarboxylation) groups herein, an exceptionally strong basic medium is required. The alkali metal hydroxides in general satisfy this need. In particular, sodium, potassium and lithium hydroxides and mixtures thereof are useful. For reasons of cost, sodium hydroxide is preferred.

For each mol of the dichloroisophthalate salt present in the reaction mixture (see equation 1 above), at least 4 mols of the alkali metal base is necessary for the satisfaction of the stoichiometric requirement. A substantial excess of the base should be present in order to reduce a polymer-producing side reaction to a satisfactory level. For this purpose, for each mol of salt feed at least 6 mols of base should be present. Best results, in general, obtain when the amount of the base is in the range 10–14 mols per mol of the dichloroisophthalate. Larger relative amounts, for example as much as 20 mols and more, may be employed.

ACIDIFICATION

Acids in general having an acid strength greater than resorcinol are suitable for the liberation of resorcinol from its alkali metal salt. Mineral acids are satisfactory because of the low cost. However, carbon dioxide (carbonic acid) is preferred as an acidifier because its use permits regeneration of the excess alkali metal hydroxide and an easy control of pH in the range 6–7 (see reaction equations above). This pH is sufficient to free resorcinol but does not liberate minor amounts of unconverted carboxylate salt feed or intermediates which may be present in the acidified reaction product mixture.

WATER DILUENT

From an inspection of equation 1 above, water does not appear to be a reactant in the reaction system. However, in the absence of water the results are poor and the processing is difficult. Mixing and local overheating effects in particular are not good. At least about 0.5 mol of water per mol of hydroxide should be present in the mixture. An excess of water relative to the hydroxide, on the other hand, adversely affects the desired reaction. When the mol ratio of water to hydroxide exceeds about 1 to 1, the results become progressively poorer as the ratio becomes larger. From this fact, it is inferred that amounts of water substantially in excess of a 1:1 ratio reduces the basicity of the hydroxide reagent. Useful results are achieved when the water-to-hydroxide ratio is below about 9, but for satisfactory conversions of the dichloroisophthalate salt to resorcinol this ratio should not exceed about 3–5; and, in general, for the best results, for each mol of hydroxide in the reaction mixture the amount of water should be in the range 1 to 3 mols, preferably 1 mol, of water.

Along with water, if desired, methanol and ethanol may be added to the reaction system as diluents. However, because of the relatively lower boiling points of these alcohols, their presence in the system results in higher system pressures. Similarly, dimethylsulfoxide may also be used as a diluent (see, for example, U.S. Pat. No. 3,481,991) for the present displacement reaction, but such use complicates the resorcinol recovery stage and hence is not a preferred mode.

REACTION PROMOTERS

Resorcinol is produced by the process herein in the absence of catalysts. The presence in the reaction medium of a copper compound, however, is beneficial. Copper compounds, in general, which convert to oxide(s) of copper in the presence of strong alkali metal hydroxides are useful promoters for the reaction. Thus, representative promoters suitable for use herein include cuprous oxide, copper chlorides, carboxylates, nitrates, sulfates, acetates, and the like copper compounds.

Trace amounts of copper oxide are beneficial. Satisfactory amounts are in the range 0.01 to 0.25 mol per mol of the dichloroisophthalate salt. Larger relative amounts may be used, but cost becomes a factor. The preferred range is 0.05 to 0.2 mols of promoter (based upon copper) per mol of the dichloroisophthalate feed.

The following examples are for the further illustration of the invention.

EXAMPLES

EXAMPLE 1 — Chlorination of Metaxylene

A 300-ml, 3-necked, round-bottomed flask covered with aluminum foil and equipped with a stirrer, a gas inlet tube, a thermometer, and a condenser exhausting into an aqueous caustic solution was charged with 106.2 g (1.0 mol) of metaxylene and 2.0 g of ferric chloride. Chlorine gas was added at a rate of 250 ml per minute along with nitrogen at 7 ml per minute. During this time, 171 minutes, the temperature was maintained at 8° to 12°C. At the end of the time, nitrogen at 300 ml/minute was passed through the reaction mixture for 15 minutes. Then the reaction mixture was washed with 2 100-ml portions of water and was dried over magnesium sulfate. The dried material weighed 176.5 g. A nuclear magnetic resonance analysis showed only ring chlorination products.

The reaction mixture was distilled at 10 mm Hg pressure in a 30-inch tantalum spiral column. The results were as follows:

TABLE I

| Fraction | Boiling Point,°C. | Weight, g | Dichlorometa-xylene, % |
|---|---|---|---|
| 1 | 52-62 | 12.3 | 2.6 |
| 2 | 62-91 | 10.0 | 91.6 |
| 3 | 91-95 | 9.2 | 99.6 |
| 4 | 95 | 80.0 | 100 |
| 5 | 95 | 32.8 | 100 |
| 6 | 95-124 | 2.9 | 74.5 |
| 7 | 124 | 14.7 | 0 |
| Residue | — | 8.3 | 0 |

Analysis of Fraction 4 showed it to be a mixture of 4,6-dichloro-1,3-dimethylbenzene and 2,4-dichloro-1,3-dimethylbenzene in a 70:30 ratio, respectively.

EXAMPLE 2 — Oxidation of Dichlorometaxylene

A 5-liter, round-bottomed flask equipped with a stirrer, thermometer, and a reflux condenser was charged with 68 grams (0.39 mol) of dichlorometaxylene (Fraction 4 of Example 1), 272 g (1.72 mols) of potassium permanganate and 2,500 ml of water. This mixture was refluxed for 31 hours. Then an additional 62 g (0.39 mol) of potassium permanganate was added and refluxing was continued for 8 more hours. Again, 30 g (0.19 mol) of potassium permanganate was added, and refluxing was continued for 28 hours. After adding 600 ml of water, 1,900 ml were removed from the flask by distillation.

The reaction mixture was filtered while hot. After cooling, both the distillate and the filtrate were extracted separately with hexane. The hexane extracts were combined and dried over magnesium sulfate. The dried extracts were placed on a hot plate and the hexane removed by evaporation to leave 5.6 g of dichlorometaxylene, indicating a 92% conversion.

The extracted filtrate was acidified with 250 ml of concentrated hydrochloric acid and allowed to stand for 16 hours. At the end of this time, the precipitate was removed by filtration to give 74.6 g of dichloroisophthalic acid. The filtrate was then extracted with ether, and the ether evaporated to give 5.6 g of additional dichloroisophthalic acid. Total yield was 80.2 g (97%).

EXAMPLES 3-10 — Hydrolysis and Decarboxylation of Dichloroisophthalic Acid

A 300-ml rocker autoclave was charged with 12 g (0.05 mol) of dichloroisophthalic acid (from Example 2, 14 g (0.35 mol) of sodium hydroxide, and 33 g of water. The reactor was sealed, rocked, and heated at 232° to 252°C. for 40 minutes. During this time, the pressure was in the range of 300-500 psig. Then the reactor was cooled, and the contents removed. The reaction mixture was acidified to pH <1 with concentrated hydrochloric acid. The acid solution was extracted with 3 400-ml portions of ether, which were combined and washed with aqueous sodium bicarbonate. Then the ether portion was extracted with 200 ml of a 5% caustic solution. This ether solution was dried over magnesium sulfate. The ether was removed by evaporation to give 4.6 g of crude product which contained 1.5 g of resorcinol (32%) and 3.1 g of metachlorophenol.

The aqueous bicarbonate extract and the aqueous caustic extract were acidified with hydrochloric acid, extracted with ether, and the ether extracts evaporated to dryness to give 2.0 g of dichloroisophthalic acid, indicating an 83% conversion.

Similar equipment and procedures were utilized in Examples 4-10. The conditions and results of Examples 3-10 are listed in Table II below.

TABLE II

| Ex. No. | Na$_2$DCIP[1] Mols | Na$_2$DCIP[1] Type | NaOH Mols | Ratio Base: Na$_2$DCIP | H$_2$O Mols | Ratio H$_2$O: Base | Catalyst, Wt. %[2] | Temp., °C. | Time, Min. | Conversion, % | Yield Resorcinol, Mol % |
|---|---|---|---|---|---|---|---|---|---|---|---|
| 3 | 0.05 | Mix[3] | 0.25 | 5.0 | 2.2 | 4.0 | — | 250 | 30 | 83 | 32 |
| 4 | 0.10 | 4,6- | 0.60 | 6.0 | 3.0 | 5.0 | Cu$_2$O, 10 | 200-208 | 45 | 90 | 64 |
| 5 | 0.09 | 4,6- | 0.62 | 7.0 | 3.0 | 5.0 | " | 200 | 60 | 94 | 67 |
| 6 | 0.08 | 4,6- | 0.50 | 6.2 | 2.5 | 5.0 | " | 170-177 | 60 | 77 | 70 |
| 7 | 0.06 | 4,6- | 0.45 | 7.5 | 1.6 | 3.6 | " | 225-229 | 30 | 94 | 51 |
| 8 | 0.10 | 4,6- | 1.30 | 13.0 | 3.6 | 3.3 | " | 200-212 | 60 | 88 | 89 |
| 9 | 0.30 | 4,6- | 3.90 | 13.0 | 3.9 | 1.0 | " | 200-212 | 60 | 89 | 96 |
| 10 | 0.10 | 2,4- | 1.30 | 13.0 | 3.5 | 2.7 | " | 200-208 | 60 | 93 | 97 |

[1]Dichloroisophthalate
[2]Based on DCIP
[3]70% 4,6- + 30% 2,4-DCIP

The data in the above examples clearly establish that alkali metal salts of 2,4- and 4,6-dichloroisophthalic acid and mixtures thereof are effectively converted to resorcinol by the novel process herein described.

It is to be understood that the invention is in no way limited by the specific examples given herein and that many modifications and variations may be made without departing from the spirit and scope of the inventive contribution as set forth in the following claims.

What is claimed is:

1. A method for the production of resorcinol comprising:
   a. dichlorinating metaxylene in the liquid phase under reaction conditions effective to produce a 2,4- and 4,6-dichlorometaxylene mixture and recovering the 2,4- and 4,6-dichlorometaxylene mixture;
   b. oxidizing the recovered 2,4- and 4,6-dichlorometaxylene mixture under reaction conditions effective to produce the corresponding dichloroisophthalic acid isomeric mixture;
   c. reacting the acid with an alkali metal hydroxide by heating a mixture of the reactants in the liquid phase in the presence of water wherein the heating is above about 150°C. and below about 270°C., wherein for each mol of the resulting alkali metal salt of the acid the mixture contains an amount of the hydroxide in the range from about 4 to 20 mols, and wherein for each mol of the hydroxide the mixture contains an amount of water in the range from about 0.5 to below about 9 mols; and d. acidifying the resulting reaction product mixture.

2. The method as in claim 1 further characterized in that the reaction of step (c) is promoted by copper oxide.

3. The process as in claim 1 further characterized in that resorcinol is recovered from the resulting aqueous reaction mixture by:

a. Acidifying the mixture with carbon dioxide; and
b. Separating the resorcinol from the acidified mixture by extraction with ether.

* * * * *